(12) United States Patent
Lasko

(10) Patent No.: US 8,167,516 B2
(45) Date of Patent: May 1, 2012

(54) PELLET DELIVERY SYSTEM

(76) Inventor: Bernard Lasko, Spartanburg, SC (US)

(*) Notice: Subject to any disclaimer, the term of this patent is extended or adjusted under 35 U.S.C. 154(b) by 44 days.

(21) Appl. No.: 12/819,491

(22) Filed: Jun. 21, 2010

(65) Prior Publication Data

US 2011/0142552 A1    Jun. 16, 2011

Related U.S. Application Data

(63) Continuation-in-part of application No. 12/031,765, filed on Feb. 15, 2008, now abandoned.

(51) Int. Cl.
*B65G 53/52* (2006.01)
(52) U.S. Cl. ........... 406/92; 406/127
(58) Field of Classification Search .......... 406/26, 406/28, 29, 50, 51, 52, 68, 70, 85, 92, 108, 406/122, 127, 128, 129, 132–136, 144, 191, 406/192, 197
See application file for complete search history.

(56) References Cited

U.S. PATENT DOCUMENTS

| | | | | |
|---|---|---|---|---|
| 923,779 A * | 6/1909 | Doble | ............ | 222/638 |
| 1,386,009 A * | 8/1921 | McDonald | ............ | 406/29 |
| 1,423,536 A * | 7/1922 | Moser | ............ | 366/11 |
| 2,794,686 A * | 6/1957 | Anselman et al. | ............ | 406/95 |
| 3,027,049 A * | 3/1962 | Roffelsen | ............ | 222/41 |
| 3,840,274 A * | 10/1974 | Williams et al. | ............ | 406/19 |
| 4,300,725 A * | 11/1981 | Moherek | ............ | 239/684 |
| 4,381,897 A * | 5/1983 | Arbeletche et al. | ............ | 406/93 |
| 4,573,830 A * | 3/1986 | Richardson et al. | ............ | 406/84 |
| 4,614,283 A * | 9/1986 | Becker | ............ | 221/278 |
| 5,118,226 A * | 6/1992 | Horii et al. | ............ | 406/194 |
| 5,232,314 A * | 8/1993 | Hopkins | ............ | 406/92 |
| 5,236,021 A * | 8/1993 | Bewlay et al. | ............ | 141/34 |
| 6,039,512 A * | 3/2000 | Chooi et al. | ............ | 406/85 |
| 6,200,071 B1 * | 3/2001 | Karasawa | ............ | 406/194 |
| 6,386,800 B1 * | 5/2002 | van Eyck | ............ | 406/95 |

* cited by examiner

*Primary Examiner* — Gene Crawford
*Assistant Examiner* — William R Harp

(57) ABSTRACT

Palletized materials are delivered in controlled quantity into a pulse modulated air stream. A vortex of compressed air gates the pellets into flexible small diameter tubing for transit to a hot melt adhesive application apparatus. Pellets of different materials, sizes, and shapes can be combined in a defined ratio within several seconds of melting at the application point. Pellet delivery air can be utilized for spray application of the melted material.

8 Claims, 3 Drawing Sheets

PELLET DELIVERY SYSTEM

CROSS-REFERENCE TO RELATED APPLICATIONS

This application claims the benefits of provisional application Ser. No. 60/891,162 filed Feb. 22, 2007 in the United States Patent and Trademark Office.

FIELD OF INVENTION

The invention utilizes a controlled air stream to deliver material pellets from a reservoir to a melt on demand application apparatus.

BACKGROUND OF THE INVENTION

A large portion of hot melt adhesive is produced in pellet form. Melting and application equipment is often continuously loaded from large containers with vacuum transit equipment delivering the material to the melting equipment reservoir. These systems use a large volume of compressed air to draw the pellets from the container and carry them in the air stream through large diameter tubing to the melt and application apparatus location. The material is melted and pumped through heated hoses under high pressure to application nozzles. When a pattern of adhesive is applied by robotic arm, a Cartesian platform, or handgun, manipulating the heavy hot pressurized hoses requires excessive power. These application systems can be served by small melt on demand modules as described in Lasko U.S. Pat. No. 6,223,950 that require pellet delivery at the rate of application. The delivery tubing needs to be of small diameter, lightweight, and flexible. The apparatus of the invention can deliver 30 pounds of pelletized hot melt adhesive per hour over 20 feet in 7/16" ID flexible tubing.

SUMMARY OF THE INVENTION

The apparatus of the invention combines a means of separating pelletized material into a controlled stream and air propelling this defined quantity of pellets in a flexible delivery tube to the melting and application apparatus. A gap between a rotating and a stationary concentric member is adjusted to accommodate various size pellets exiting a hopper. The speed of the rotating member is adjusted to control the feed rate. Air pressure, pulse rate, and duration of a compressed air pulse are adjusted to match the feed rate. The thickness of an air vortex formed at the delivery tube entry is adjusted to restrict an uncontrolled gravity drop of pellets into the delivery tube. The variety of pellet sizes and shapes from the majority of major hot melt adhesive manufacturers can be processed in the apparatus of the invention.

Pellets can be combined in a specific ratio by joining multiple modules in a series connection. Reactive materials can be combined with this method for melting and liquid mixing at the applicator within seconds of application. Different color pellets yield a continuous visual indication of mix quality. This method can also be used to place solid inclusions of different specific gravity, in defined quantity, in the melt stream. The pellet delivery air can be utilized to spray apply the melted adhesive. Energy is conserved by the reduction in quantity of compressed air required to transport pelletized material. The embodiment of the invention described below is specifically intended to address the delivery of thermoplastic polymer pellet forms to hand held or small stationary melt on demand modules attached to adhesive pattern application apparatus.

DETAILED DESCRIPTION OF THE INVENTION

Figure 1:
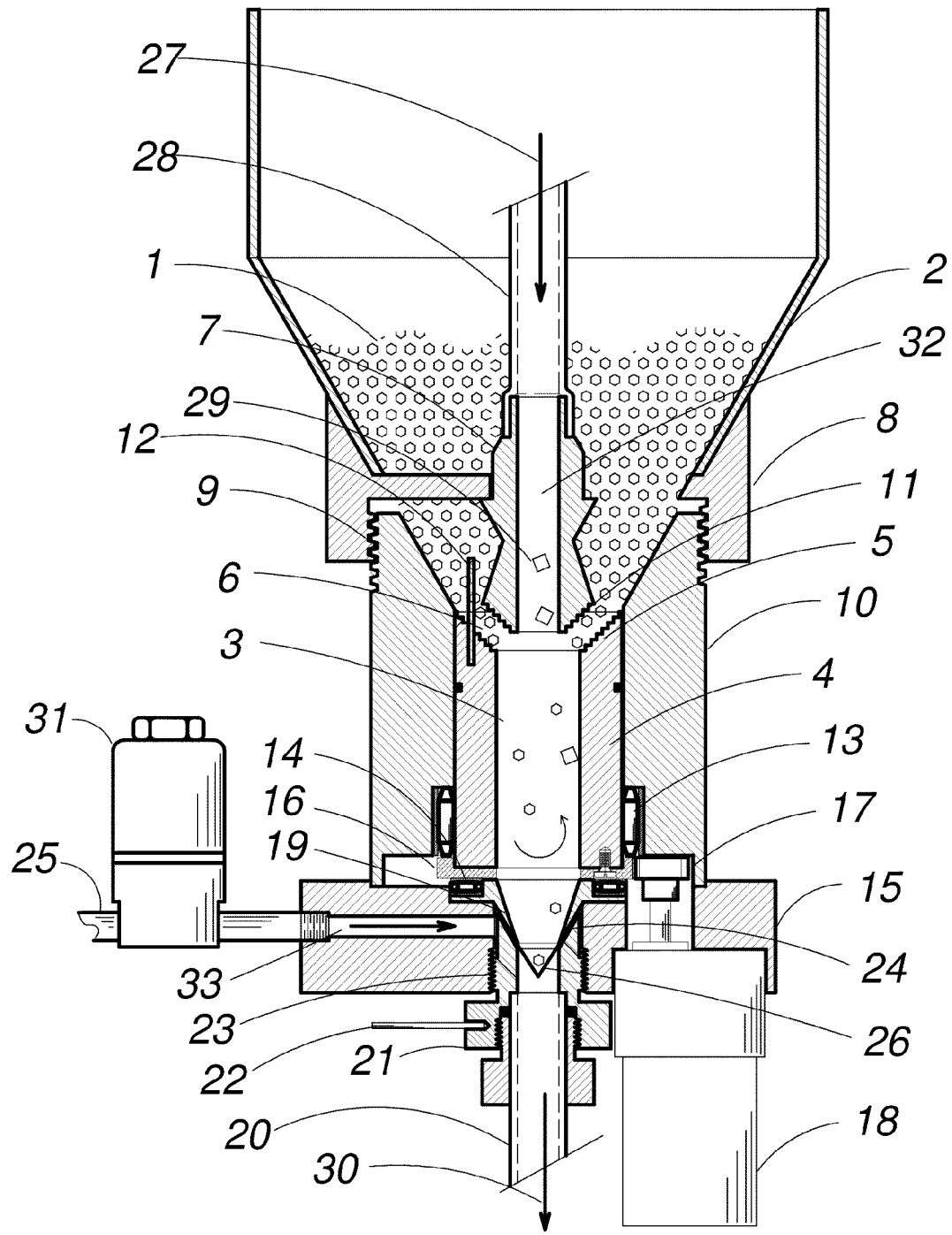
FIG. 1 is a sectional view of an apparatus for metering, mixing, and delivering pellets.

FIG. 1 is a cross section of the apparatus for controlled pellet delivery. Thermoplastic polymer pellets 1 are released from hopper 2 into chamber 3 at a variable rate by rotor 4. Rotor 4 has a serrated surface 5 at its angled entry. Gap 6 between rotor 4 and stationary plug 7 is adjusted by rotating hopper collar 8 on acme thread 9 on rotor housing 10. Gap 6 is adjusted to a linear scale position to accommodate different sizes of pellets. Collar 8 is permanently attached to hopper 2 and to plug 7 at its center hub of three spokes. Plug 7 also has serrations on angular face 11. Pin 12 is placed in the angular face of rotor 4 to prevent the bridging of pellets at the entry to gap 6.

Needle bearing 13 and thrust bearing 14 support rotor 4 in a vertical alignment of rotor housing 10 and base 15. Rotor 4 is driven by spur gear 16 and pinion 17 attached to variable speed DC motor 18. The speed of the motor controls the drop rate of pellets into chamber 3.

An angled orifice insert 19 sized to the internal diameter of delivery tubing 20 is placed in base 15 to reduce the diameter of chamber 3. The exterior face of insert 19 has an included angle of 60° to match the inverted angular face of vortex gage 21. Gage 21 is rotated by pin 22 on fine thread 23 to adjust the width of air vortex gap 24. Pressurized air is introduced at port 25 to be pulsed by solenoid valve 31. The pulsed air moves through passage 33 in base 15 to the variable vortex gap 24 creating intermittent air vortex 26. Pellets 1 being metered into chamber 3 are blocked from moving through the air vortex when it is present. The pellets within chamber 3 maintain a separation imparted by a minor air back flow from air vortex 26. When the vortex of air is not present the number of pellets delivered into chamber 3 are allowed to pass by gravity drop through the air vortex position and propelled through delivery tube 20 by the succeeding air pulses. Upon each occasion that the pellet receiver indicates that pellet delivery should be stopped, rotor 4 stops rotating, the last pellets in chamber 3 are gated through the air vortex 26, and solenoid 31 is held open for several seconds to expel pellets in transit to prevent a gravity backflow of undelivered pellets.

Figure 2:
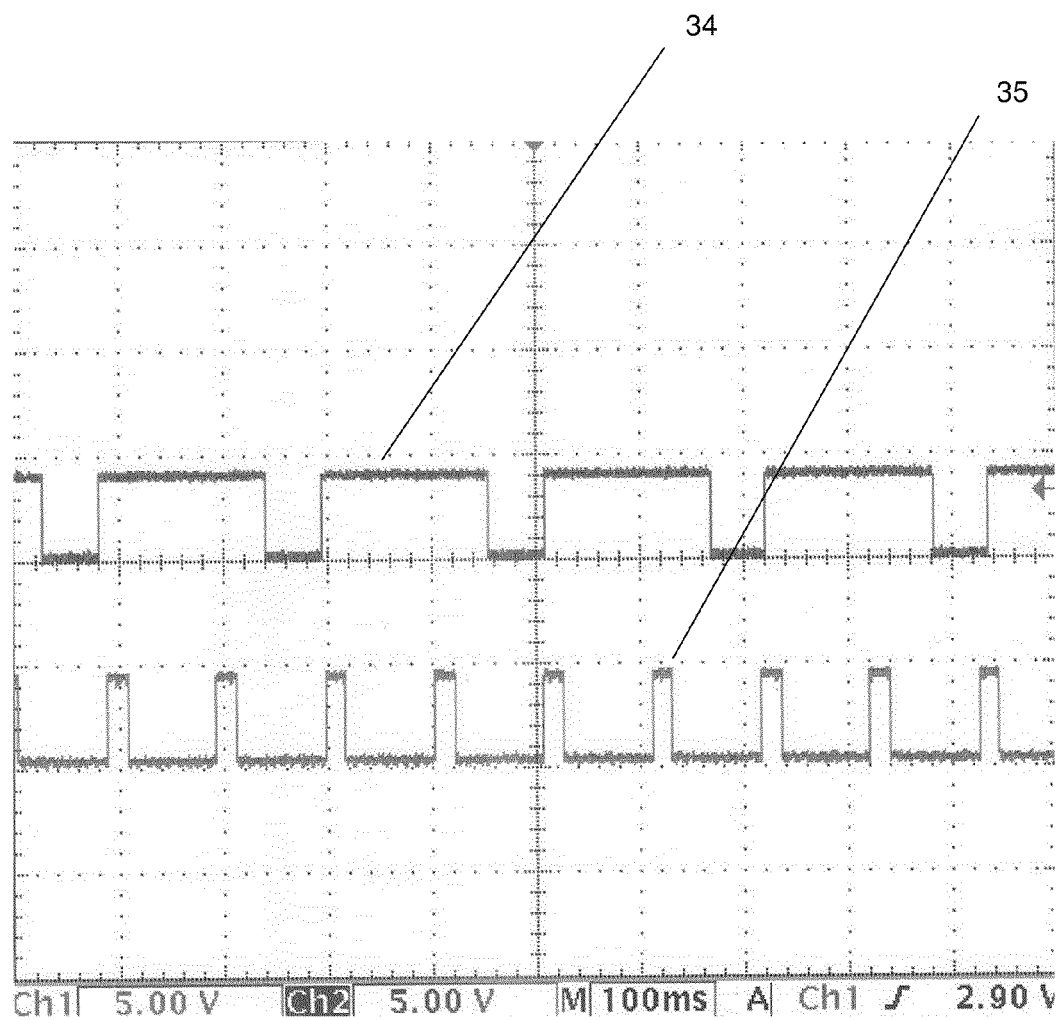
FIG. 2 is an oscilloscope trace of two different modulations of the delivery air stream.

Air compressed to 25 to 45 PSI is electronically modulated in duration at a pulse rate of 5 to 10 Hz. This results in the gating of approximately 6 to 10 pellets per cycle dependent on their size. FIG. 2 illustrates the variable duration DC pulse to the air solenoid for pellet transfer. Oscilloscope trace 35 shows that a 20% on cycle @ 10 Hz can transfer pellets at 30#/hr. over 20 feet in a 7/16" ID tube with air compressed to 45 PSI. Trace 34 shows a 75% on cycle @ 5 Hz required for including sufficient air to spray apply hot melt adhesive with the pellet transfer air exhaust.

A second unit identical to that illustrated in FIG. 1 transfers its exiting pellets 30 from tube entry 20 to the first units secondary pellet entry 27 through tube delivery end 28 that is attached to passage 32 in plug 7 of the first unit. Pellets of a second material 29 enter into chamber 3 to commingle with pellets metered by the first unit. The speed of rotor 4 is adjusted in both units to control the amount secondary pellets 29 that combine with the primary pellets 1.

Figure 3:
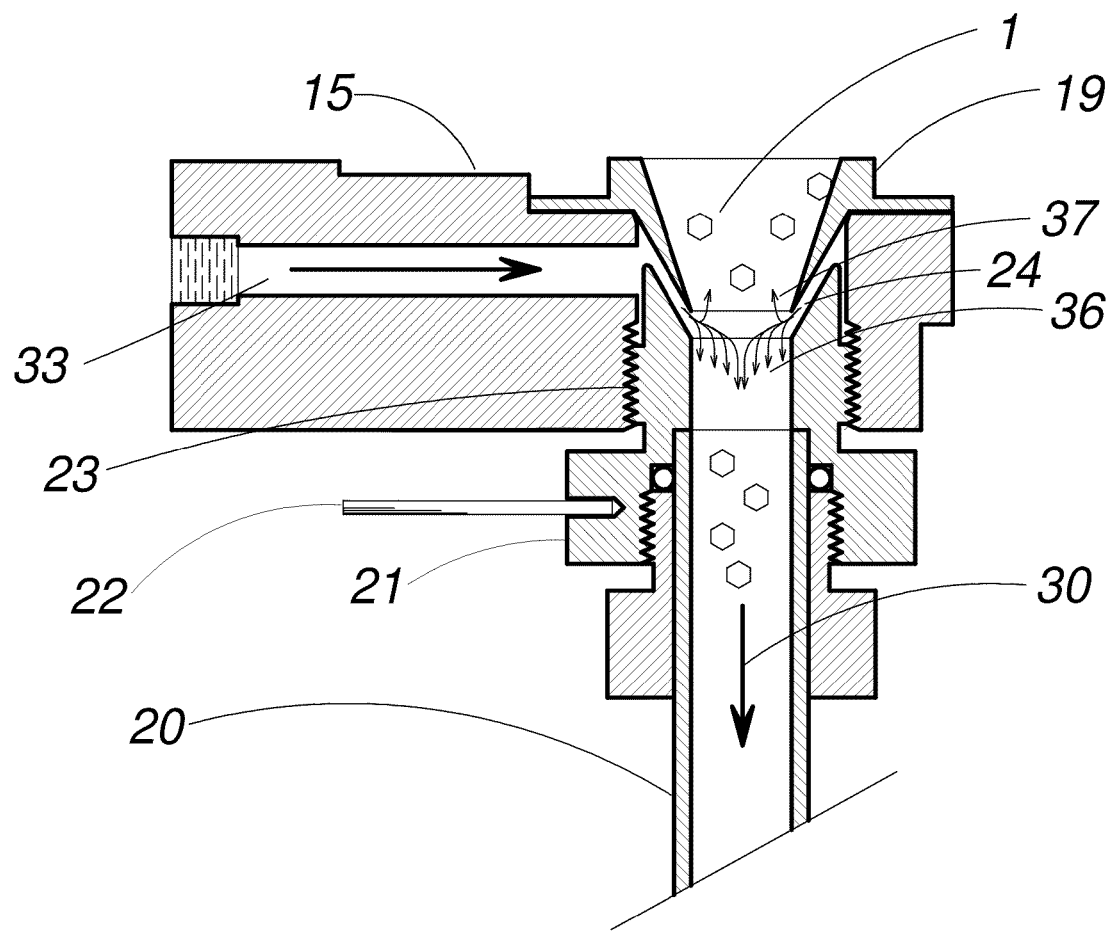
FIG. 3 is a sectional view of the elements forming the air gate that meters pellets into the delivery air stream.

FIG. 3 details the essential elements forming an air gate to space the pellets for continuous transit with a minimum of carrier air. Air from passage 33 is intermittently dispensed into the exiting pellet stream 30 of delivery tube 20 through a 360° air gap 24. The exit area of the air gap 24 is only adjustable to be greater than the area of inlet passage 33. This prevents the entering primary transport air 36 velocity from increasing at this orifice. Therefore, air pressure above insert 19 is not decreased and arriving pellets are not drawn into the air stream. A minor air backflow 37 results form the choice of the 60° entry angle and suspends pellets 1 as in a fluid bed. The weight of the polymer pellet in gravity drop is not sufficient to break through the air introduced to delivery tubing 20. The number of pellets 1 metered to the gating position in each air pulse cycle is limited to avoid pellet bridging at the entry to the air gap vortex 24.

I claim:

1. An apparatus for transporting pelletized material comprising:
    a hopper to contain and present the pelletized material at the hopper apex by gravity flow;
    a rotating member and a stationary member, wherein the rotating member and the stationary member are positioned concentric at the hopper apex to form an annulus wherein pellets are rolled at a controlled rate;
    a motor for imparting rotation to the rotating member;
    a substantially vertical chamber for gathering a plurality of pellets;
    a gate at the bottom end of the chamber formed by a vortex of expiring compressed air that is modulated by a solenoid valve; and
    tubing to transport pellets suspended in the expiring compressed air.

2. The apparatus according to claim 1, further comprising: a threaded collar, the threaded collar attached to the stationary member and the hopper, wherein the width of the annulus is adjusted by rotation of the threaded collar for transit of different size pellets.

3. The apparatus according to claim 1, the rotating member and stationary member comprising pellet transit annulus forming members having concentric facing surfaces which are serrated to grip the surface of irregular shaped pellets to break their bond.

4. The apparatus according to claim 1, wherein the thickness of the air vortex is adjustable to match the weight of heavier pellets.

5. The apparatus according to claim 1, wherein the speed of rotation of the rotating element is adjustable to present pellets to the gate at a variable rate.

6. The apparatus according to claim 1, wherein the tubing to transports pellets comprises flexible tubing.

7. A method of measuring and transporting pelletized material comprising the steps of:
    delivering a controlled quantity of pellets into a holding chamber by rolling them through an annulus formed between a stationary surface and a rotating surface, wherein the stationary surface and the rotating surface are concentric with one another;
    gating the pellets in the chamber intermittently through a vortex of compressed air; and
    propelling the pellets through a delivery tube with the intermittent release of compressed air of successive gating pulses.

8. A method of measuring and transporting pelletized material comprising the steps of:
    delivering a controlled quantity of pellets into a holding chamber by rolling them through an annulus formed between a stationary surface and a rotating surface, wherein the stationary surface and the rotating surface are concentric with one another;
    combining different pelletized material in variable quantity by receiving pellets transported from a second unit to be coaxially combined in the holding chamber;
    gating the pellets in the chamber intermittently through a vortex of compressed air; and
    propelling the pellets through a delivery tube with the intermittent release of compressed air of successive gating pulses.

* * * * *